Jan. 23, 1951     E. MEINCKE     2,538,876

POWDER-ASSISTED THERMOCHEMICAL STACK-CUTTING

Filed May 10, 1949

INVENTOR
EDWARD MEINCKE
BY
*D.C.Harrison*
ATTORNEY

Patented Jan. 23, 1951

2,538,876

UNITED STATES PATENT OFFICE 2,538,876

POWDER-ASSISTED THERMOCHEMICAL STACK CUTTING

Edward Meincke, Summit, N. J., assignor to The Linde Air Products Company, a corporation of Ohio Application May 10, 1949, Serial No. 92,323

4 Claims. (Cl. 148—9)

This invention relates to precision kerf-cutting of gravity-stacked carbon steel plates with a vertically descending stream of cutting oxygen containing sparks of combustile metal powder consisting essentially of iron.

The present application is a continuation-in-part of my applications Serial No. 547,062, filed July 28, 1944, for Thermochemical Metal Removal, now Patent No. 2,470,999, issued May 24, 1949; and Serial No. 681,352, filed July 3, 1946, for Thermochemical Cutting, now abandoned.

Quantity production of parts flame-cut from relatively flat carbon steel members with the aid of the oxy-acetylene cutting machine is greatly facilitated by a process that involves cleaning and piling a number of the flat members one on top of the other, clamping them tightly together, and making the cut as if the clamped members were one piece of solid metal. Such process, known as stack-cutting, has made practicable the thermochemical cutting of thin sheets and plates, and has resulted in an increase in the productive capacity of cutting machines, greater uniformity of the shape-cut parts, and a lower cost per unit of production. With constant improvement in the accuracy of cutting machines and blowpipe operations, and with an increasing number of well-trained cutting-machine operators, more and more manufacturers are adopting the oxy-acetylene cutting process as an important step in their production work. Most large manufacturing organizations today require machinery which can repeat a particular production function. This requirement has been met by the development of automatic tracing devices. Stack-cutting further increases the productive capacity of cutting machines by making possible the shaping of many identical parts in one operation. The cutting machine can be guided by hand or made automatically to follow a templet. However before the present invention stack-cutting was subject to serious difficulties some of which are set forth in details below.

The first step required in successful stack-cutting according to the prior art was that of providing perfectly clean and flat sheets or plates. This was very important since failure was often due to insufficient attention to such step. All dirt, mill scale, rust and paint had to be removed from the members to be stack-cut. No practical amount of clamping force could reduce the spacing between stacked plates to less than 0.003 in. (an approximate maximum allowance) if the cleaning operation was inadequate. Prior cleaning methods included pickling, sandblasting, wire brushing, flame descaling, or an air blast on apparently clean surfaces. Plates or sheets also had to be stored indoors if possible and kept free from moisture by piling them flat rather than in an upright position. In this way, only the top piece was exposed to rusting action.

In general, for work of moderate thickness, good results were obtained with plates or sheets in a stack about 3 to 4 inches thick, although stacks of greater thickness could be cut. The accuracy of cutting, however, depended on the degree of tightness with which the stack was clamped. Such accuracy diminished somewhat in stacks more than 4 inches in thickness, due to the greater difficulty in effecting a tight clamp. On the other hand, a small stack was generally made in stack-cutting light-gauge metal, so as to prevent melting of the top sheet edge with the preheating flame and also prevent fusing of the sheets together. In this case, too, the thickness of each stack to be successfully cut depended largely upon the adequacy of the clamping facilities.

After cleaning and stacking, the next necessary step of the prior art was to remove entrapped air from between the thicknesses of the work. The pile of plates was placed on a cutting table or trestle, and with a heavy machinist's hammer, was pounded along the line of the cut to be made, thereby squeezing out air and eliminating any small depressions between the plates due to warping, bending, or slight variations in plate thickness. If air or magnetic quick acting clamps were used they were applied before pounding and then reapplied several times in succession to get the stack of plates as tight as possible. Other types of clamps had to be tightened as the pounding progressed.

The prior importance of sufficient clamping pressure cannot be overemphasized. Ineffective clamping jeopardized the success of the entire operation even though the other prior art requirements for stack-cutting were fulfilled. In shops where heavy power presses of large size were available it was found effective, but somewhat expensive particularly with stacks of small plates where the cutting was to be done near the edge, to hold the work together by welding beads applied while the stack was clamped in a power press. Such beads were made along edges of the plates which were not to be finished, or to be scrap. The stack was then moved by a crane to the cutting table where stack-cutting was performed. After the cutting was completed, the beads either were removed with a cutting blowpipe, or were left to hold the scrap together. This was an effective method of clamping where large presses were available, but it could not be used on very wide plates because of unavoidable buckling in the middle of the stack. Some fabricators also resorted to bolting arrangements in which the stack of plates was held together by heavy erecting bolts while cutting was in progress. Plates of heavy steel with one or more bolt holes were required to stretch across wide openings in the stack to prevent buckling in large plates.

In some respects the starting of the cut on stacked plates was the most important part of the operating technique. This was the test of all the preparatory work of cleaning, stacking and clamping. A false start usually damaged the edges of several plates and produced conditions at the starting point such that a second start was extremely difficult. To insure against mishap at the beginning of the cut, several methods of starting were devised. In one method the plates were aligned so that each plate in the stack projected slightly over the one below. This gave a condition at the starting point such that the wall of the stack sloped inwardly from the top corner. The preheat gas jets were lighted and adjusted. The cut was begun as usual, but the cutting action started in the top plate first, and gradually progressed down through the stack as the cutting blowpipe advanced.

Another method for starting which was used extensively required a swinging blowpipe. The stack was prepared in the normal way and was clamped for cutting. The cutting machine was fitted with a special attachment for holding the blowpipe. This attachment provided an angle adjustment of the blowpipe in the plane of the cut. The starting procedure was the same as in other machine cutting, except that the nozzle was slanted away from the stack at the start. The cutting action gradually progressed downward through the stack as the blowpipe nozzle advanced. When the cutting action was established through the whole stack, the blowpipe was adjusted back to the vertical for the remainder of the cut. The swinging adjustment, of course, had to take place while cutting in scrap material. Such method had the disadvantage of requiring extra manipulation during cutting.

Still another starting procedure utilized the "preheated edge" method. In such method the edges of the plates had to be straight and square. The stack of plates was arranged so that the edges at the start were aligned vertically before clamping. The preheat gas jets were lighted and the cutting machine adjusted for starting. A welding blowpipe flame then was played on the edge of the stack at the starting point. As soon as the edges of the plate were brought up to the ignition temperature, the cutting machine was moved into position and the cut was started.

A factor which made starting more difficult on the edge of a stack than on solid material was sheared plate edges. Plate edges cut with the average shear are slightly rounded on the top and have a deformed bottom edge which has been distorted downwardly by the action of the shear blade. Dull shears sometimes tear the edges of the plates, producing a "shattered" effect. When no oxy-acetylene cut edges were available for a starting point, the sheared edges had to be stacked with the rounded edges downward. This obviated the tendency of the cutting oxygen jet to be deflected by the rounded edge of the plate.

Thus stack-cutting was relatively specialized, expensive and time-consuming according to the prior art.

The main object of this invention is to provide an improved thermochemical precision stack-cutting process which entirely avoids the need for flattening, cleaning and clamping the sheets or plates constituting the work; is self-starting regardless of the condition of the work at the starting zone; is faster, superior and more economical, stable and reliable than the prior art, and which also results in more precise and smoother kerf-walls of better quality, less scrap-loss and more readily separable parts. Other objects will appear in the following description.

According to the present invention the work may be prepared by simply stacking or piling a desired number of sheets or plates of carbon steel loosely on one another. The work parts may be in uncleansed run-of-mill condition, and clamps may be entirely omitted; gravity being sufficient to hold the parts in stacked position on the cutting table. When so prepared the work comprises spaced apart thicknesses of metal having strongly oxidation-resistant matter including scale and air masses or spaces therebetween, which would impair the prior art stack-cutting operation involving preheating flame jets and a descending stream of commercially pure cutting oxygen, to such an extent that the kerf-walls would be uneven or rough and, in some cases, the cut eventually would be lost entirely, ruining the work.

However, according to the present improved process, such trouble is entirely avoided by supplying a relatively small but uniform flow of finely divided adjuvant powder comprising particles of exothermically oxidizable metal (such as combustible metal powder consisting essentially of iron), continuously to the descending cutting oxygen stream directly before the cut is started, as well as during the entire kerf-cutting operation. The fine powder particles of metal are heated by the preheating flame and then ignited in the cutting oxygen stream, so that the latter appears as a shower of ignited solid particles or sparks prior to the start of the cut and as a spark illuminated stream during the cutting operation in which the stream is moved progressively at right angles to its vertical axis and transversely of the stack at a substantially constant kerf-cutting speed along the desired path. The nozzle orifice velocity of the stream of cutting oxygen is preferably between 980 feet per second, which is the acoustic velocity thereof, and 1370 feet per second. The ratio of powder flow (in pounds) to oxygen flow (in pounds) is preferably between 0.068 and 0.910 for best results at the acoustic velocity of the cutting oxygen stream.

By virtue of the added powder the operation is self-starting regardless of the condition of the starting zone of the stack, the kerf is narrow and straight, i. e., has no drag, so that the direction of the cut can be changed as desired without affecting the width of the kerf, especially near the bottom thereof, even when the kerf cutting speed is very fast, which is important in stack-cutting, since the object of stack-cutting is to have all of the resulting parts precisely similar in shape and equal in size. The additional cost of the powder is very low compared to the great saving in the overall cost of the improved stack-cutting process over the prior art. Clamping of the plates alone required about 40% of the overall time necessary for stack-cutting before the present invention. Such clamping time, labor and equipment are avoided by the present invention.

Figure 1:
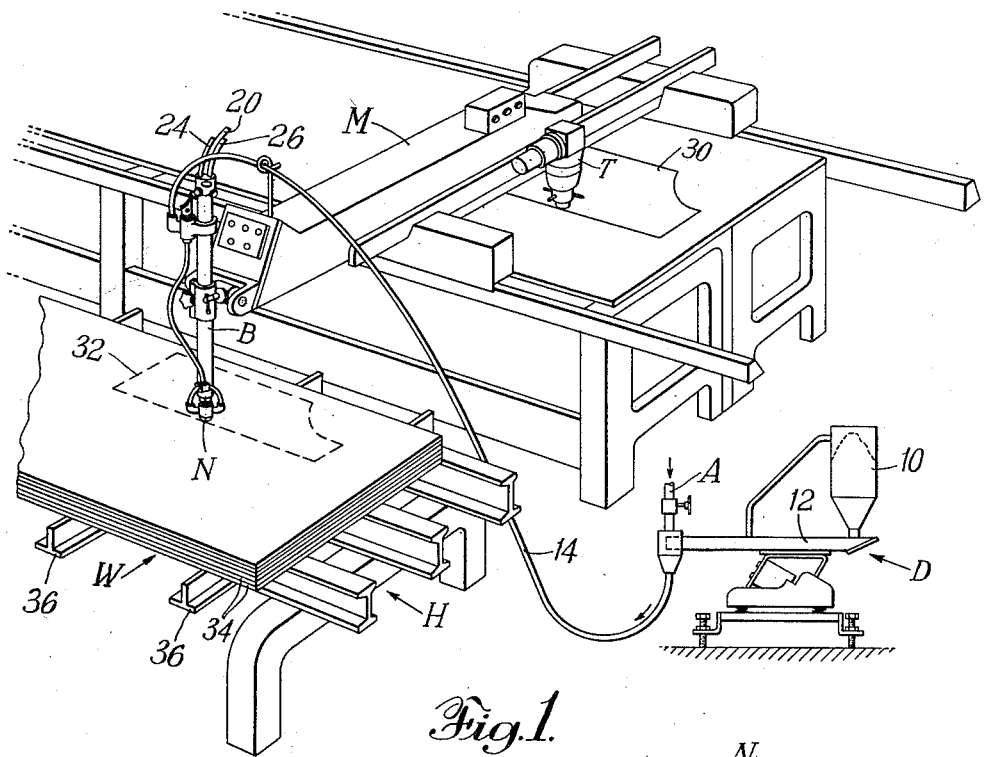
Fig. 1 is a view mainly in perspective of a stack-cutting set-up illustrating the invention.
Figure 3:
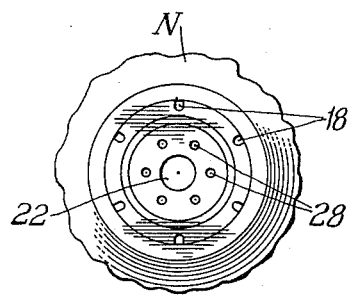
Fig. 3 is an end view of the cutting torch shown in Fig. 2.
Figure 2:
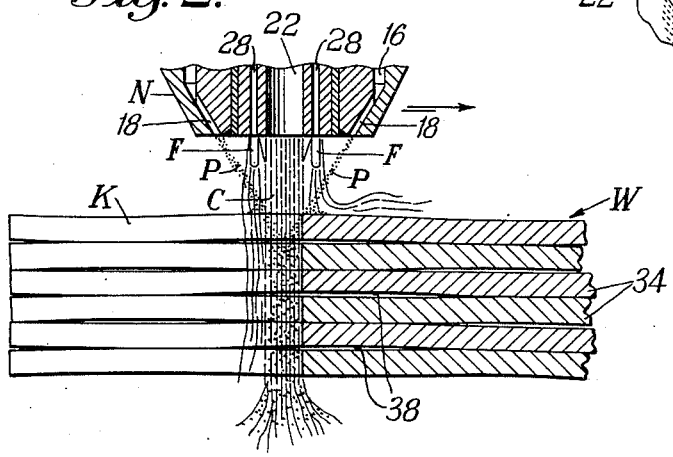
Fig. 2 is an enlarged framentary view in cross section showing how the kerf is cut.

In the illustrated set-up a shape cutting machine M is provided with a vertical cutting blowpipe B adapted to discharge a descending stream of cutting oxygen C, an annularly arranged series of substantially parallel oxy-acetylene preheating flames F, and an annularly arranged series of inwardly inclined powder carrying air jets P. The jets P are directed downwardly and inwardly so as to merge with the cutting oxygen stream at an included angle of about 30 degrees at the point where the stream C enters the top of the kerf K. The longitudinal axes of the jets P pass centrally between the longitudinal axes of the flames F, so that the powder particles are heated by the flames with as little interference to the latter as possible. To insure a uniform flow of powder a vibrator type of powder dispenser D is preferred. Such dispenser comprises a closed hopper 10 containing a supply of powder which is fed at a uniform rate by a vibrated trough 12 to a hose 14 into which compressed air is discharged by a pipe A. The pipe A is connected to a suitable source of air under substantially constant regulated pressure. The hose 14 conducts the powder laden air to suitable means leading to an annular passage 16 in the nozzle N, such passage 16 being in communication with inwardly inclined outlets 18.

The blowpipe B is supplied with cutting oxygen gas at a regulated substantially constant pressure through a hose 20. Such oxygen flows through the blowpipe and is discharged from a central passage 22 in the nozzle N at a velocity of about 980 feet per second or more, depending upon the cutting speed. The blowpipe B is also supplied with preheating oxygen through a hose 24, and with acetylene or other fuel gas through a hose 26 each at a regulated substantially constant pressure. The preheating oxygen and combustible gas are mixed in the blowpipe B and uniformly distributed to passages 28 in the nozzle N from which the gas mixture is discharged, forming the preheating flame F.

The shape-cutting machine M is adapted to move the blowpipe B in a well known manner at a relatively constant speed horizontally in a path corresponding to that followed by a tracer T on a template 30. The vertically descending stream of cutting oxygen C traverses a similar path 32 in work W which consists of flat, gravity-stacked members such as plates 34 composed of carbon steel. The stack of plates constituting the work W rests on a cutting table H including spaced members 36 of inverted T-section. The plates 34 may have air spaces 38 therebetween, as well as scale, which would seriously interfere with successful precision stack-cutting thereof according to prior art.

However, according to the present invention, such difficulty is overcome by continuously feeding through air jets P, combustible metal powder consisting essentially of iron into the cutting oxygen stream C in the ratio of 0.068–0.910 by weight of powder to cutting oxygen, while heating such powder in the preheating flames F, whereby the particles of powder are ignited and the resulting hot and burning particles are carried downwardly along with the cutting oxygen stream. Such particles appear as a shower of sparks which first provide supplemental heat for promoting penetration through the top thickness (plate) by the oxygen stream C and then convey the hot and burning powder particles through such penetration and across any intervening air mass 38 and against the next thickness (plate) for assisting the preheating of the latter sufficiently to enable the oxygen stream C to penetrate it. The preheating flames F and the powder-carrying oxygen stream C are simultaneously advanced at a right angle to the longitudinal axis of such stream along the desired cutting path 32 on the work W to simultaneously extend the penetrations in the thickness (plate) of metal, cutting the kerf K lengthwise of such path.

The powder should consist mainly of combustible iron. Such powder containing not less than 90 per cent of free iron and not over 8.36 per cent of iron oxide has been found very satisfactory for stack-cutting according to the invention. Fluxes, such as bicarbonate of soda, are not suitable. The powder should also be fine enough so that most (45–60 per cent) can pass through a 325 mesh screen, although one-hundred per cent of the powder can be of a size sufficient to pass through a 100 mesh screen.

The tables below set forth typical chemical and screen analyses of the powder and stack-cutting data.

*Powder*

| Ingredient | Per cent |
|---|---|
| Free Iron | Not less than 80. |
| Iron Oxide (FeO) | Not more than 7.36. |
| Iron Oxide (Fe$_2$O$_3$) | Not more than 1.00. |
| Silicon Oxide | Not more than 0.40. |
| Total Carbon | Not more than 0.20. |
| Manganese | Not more than 0.50. |
| Sulphur | Not more than 0.12. |
| Other Residual Elements | Not more than 0.42. |

*Screen analysis*

| Powder | Per cent |
|---|---|
| On 60 mesh | 0.001 maximum. |
| On 100 mesh | 0.250 maximum. |
| On 200 mesh | 15–25. |
| On 325 | 22.5–32.5. |
| Through 325 | 45–60. |

Hall Flowmeter Rate, 30.0 seconds maximum.

*Powder-air stack-cutting data*

In the range of 1.5–4 ozs. per minute powder flow with 50–70 cu. ft./hr. transporting air flow, the ratios of powder flow (by weight)/air flow (by weight) were determined as follows:

| Powder Flow | | Air Flow | | Ratios, lb. powder: lb. air |
|---|---|---|---|---|
| Oz./min. | Lb./min. | Cu. ft./hr. | Lb./min. | |
| 1.5 | .0937 | 70 | .0873 | 1.07 |
| 1.5 | .0937 | 50 | .0623 | 1.503 |
| 4 | .250 | 70 | .0873 | 2.86 |
| 4 | .250 | 50 | .0623 | 4.01 |

Range=approximately 1 to 4.

With the illustrated powder cutting attachment the velocity of the transporting air as it issues from the powder ports in the attachment (i. e. flush with the end of the nozzle) is:

| Air Flow | Velocity |
|---|---|
|  | Ft./sec. |
| 50 | 217 |
| 70 | 304 |

*Powder-oxygen stack-cutting data*

| Powder Flow | | Oxygen Flow | | Ratio, Powder/ Oxygen |
|---|---|---|---|---|
| Oz./min. | Lb./min. | Cu. ft./hr. | Lb./min. |  |
| 1.5 | .0937 | 1,000 | 1.3740 | 0.0681 |
| 1.5 | .0937 | 200 | 0.2748 | 0.3410 |
| 4.0 | .2500 | 1,000 | 1.3740 | 0.1820 |
| 4.0 | .2500 | 200 | 0.2748 | 0.9100 |

The kerf-cutting operation according to the invention is self-starting regardless of the condition of the edge or the work and no pause or stop for preheating to start the kerf is necessary. For best results, however, a hesitation in the kerf-cutting movement at the start is recommended. Ordinarily the bottom of the nozzle N is spaced about ¾ to ⅞ inch from the top surface of the work when the inner cones of the preheating flames are about ¼ inch long.

By virtue of the new process there is no need to change the vertical position of the nozzle to follow the top surface contour on account of variations therein. Stated in another way it is not necessary that the top surface of the work be perfectly flat, since the powder particles burning in the cutting oxygen stream have the effect of greatly extending the preheating zone axially below the preheating flames, and the space between the top of the work and the bottom becomes no longer critical as in the case of the prior art without such powder.

Since cleaning, flattening and clamping of the plates or sheets are avoided, a substantial (up to 40 per cent) saving in over-all time is accomplished by the present invention. Also the top edges of the resulting kerf are smoother and the entire operation is more stable and reliable. The invention also extends stack-cutting to those situations where clamping is impossible. Since the kerf walls are vertical or perpendicular, the direction of the cutting action can be changed without reducing the horizontal speed of the cutting oxygen stream, even when the plates are unclean and/or have air spaces therebetween. The side walls of the kerf are narrow and very smooth and it is quite easy to separate the parts of the work after cutting. There is less scrap loss and more assurance that the cut will be completed than in the past. As a result the invention provides considerable saving in time, labor and material over the prior art. The present process has very decided advantages where large plates of intricate shapes are to be cut and clamping becomes exceedingly difficult. The use of powder eliminates all clamping, increases the cutting speed, results in quicker and better starting, improves the quality of the cut, renders the members easier to separate, and reduces scrap loss.

I claim:

1. The process of thermochemically precision shape-cutting a plurality of run-of-the-mill sheets or plates of carbon steel which comprises piling such sheets or plates loosely one on top of the other to form a stack, and thermochemically cutting a perpendicular kerf in such stock by transversely moving a downwardly flowing stream of cutting oxygen assisted by preheating flames, and by air jets containing finely divided combustible metal powder consisting essentially of iron, which jets pass through the preheating flames, heating the powder which burns in the cutting oxygen stream and effectively extends the preheating action axially of the oxygen stream downwardly through the entire stack, said stack of sheets or plates being in a loosely piled form during such kerf-cutting step.

2. In the art of thermochemically stack-cutting gravity-stocked metal plates containing masses of strongly oxidation resistant matter including air spaces between the plates, with preheating flame and a stream of cutting oxygen discharged from an oxy-fuel gas cutting blowpipe which is moved across the stack along a path extending at right angles to the axis of the cutting oxygen stream, the improvement which comprises heating combustible metal powder and adding it to the cutting oxygen stream for the purpose of substantially extending the effective preheating range of the preheating flame axially of the cutting oxygen stream and of carrying the cutting operation through such matter, and moving the oxy-fuel gas cutting blowpipe progressively above the stack along such path, thereby severing the stack progressively with the burning powder laden cutting oxygen stream, said stack of plates being in a loosely piled form during such stack-cutting operation.

3. In the art of thermochemically cutting a kerf in a loose stack of metal members consisting of carbon steel containing masses of strongly oxidation-resistant matter including air spaces between the members, with preheating flame and a descending stream of cutting oxygen discharged at a minimum rate of the order of 980 feet per second from an oxy-fuel gas cutting blowpipe which is moved above and across the stack along a path extending at right angles to the axis of the cutting oxygen stream; heating combustible metal powder in such flame and adding it to the cutting oxygen stream in the ratio of 0.068–0.910 by weight of powder flow to cutting oxygen flow, thereby substantially extending the effective preheating range of the preheating flame axially of the cutting oxygen stream and progressively carrying the cutting operation through such matter, and moving the oxy-fuel gas cutting blowpipe at a substantially constant speed progressively above the stack along such path, thereby progressively cutting a kerf in the stack with the burning powder laden cutting oxygen stream, said stack of members being in a loosely piled form during such stack-cutting operation.

4. In the art of thermochemically precision shape-cutting work composed of a loose stack of substantially flat members consisting of carbon steel with preheating flame and a descending stream of cutting oxygen discharged from an oxy-fuel gas cutting blowpipe which is moved above and transversely relatively to the work along a desired path, which operation is subject to impairment due to the presence of masses of air between the members in the axial path of the stream of cutting oxygen during the progress of the operation, the improvement which comprises adding finely divided combustible iron powder to the stream of cutting oxygen in the ratio of 0.081–0.90 by weight of powder flow to cutting oxygen flow, and heating such powder to its ignition temperature for the purpose of increasing the effective preheating distance between the blowpipe and the work and of carrying the cutting operation through any air masses within the work, and horizontally moving the oxy-fuel gas cutting blowpipe progressively above the work along a desired path of the shape to be cut without critical regard to any variation in the distance between the blowpipe and the top surface contour of the work, thereby severing the work progressively without impairment on account of such masses of air in the axial path of the powder laden stream of cutting oxygen, said stack of members being in a loosely piled form during such stack-cutting operation.

EDWARD MEINCKE.

REFERENCES CITED

The following references are of record in the file of this patent:

UNITED STATES PATENTS

| Number | Name | Date |
|---|---|---|
| 968,350 | Harrison | Aug. 23, 1910 |
| 1,494,003 | Malcher | May 13, 1924 |
| 2,451,422 | Wagner | Oct. 12, 1948 |

OTHER REFERENCES

Metals Handbook, 1939 edition, pages 930-935; pub. by American Society for Metals, Cleveland, Ohio.